(12) United States Patent
Yim

(10) Patent No.: US 8,892,520 B2
(45) Date of Patent: Nov. 18, 2014

(54) STORAGE DEVICE INCLUDING A FILE SYSTEM MANAGER FOR MANAGING MULTIPLE STORAGE MEDIA

(75) Inventor: Keun Soo Yim, Chonnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 717 days.

(21) Appl. No.: 12/358,322

(22) Filed: Jan. 23, 2009

(65) Prior Publication Data

US 2009/0265506 A1 Oct. 22, 2009

(30) Foreign Application Priority Data

Apr. 17, 2008 (KR) .................. 10-2008-0035475

(51) Int. Cl.
| | |
|---|---|
| *G06F 7/00* | (2006.01) |
| *G06F 17/00* | (2006.01) |
| *G06F 3/06* | (2006.01) |
| *G06F 12/02* | (2006.01) |

(52) U.S. Cl.
CPC .............. *G06F 3/0664* (2013.01); *G06F 3/068* (2013.01); *G06F 3/0647* (2013.01); *G06F 3/0605* (2013.01); *G06F 2212/7205* (2013.01); *G06F 12/0246* (2013.01)
USPC .......................................... 707/654; 707/655

(58) Field of Classification Search
USPC ................................................ 707/654, 655
See application file for complete search history.

(56) References Cited

U.S. PATENT DOCUMENTS

| | | | | |
|---|---|---|---|---|
| 5,873,085 A | * | 2/1999 | Enoki et al. ........................... | 1/1 |
| 5,987,565 A | * | 11/1999 | Gavaskar ....................... | 711/112 |
| 6,269,382 B1 | * | 7/2001 | Cabrera et al. ........................ | 1/1 |
| 6,523,132 B1 | | 2/2003 | Harari et al. | |
| 6,553,408 B1 | * | 4/2003 | Merrell et al. ................. | 709/213 |
| 6,711,043 B2 | | 3/2004 | Friedman et al. | |
| 6,914,846 B2 | | 7/2005 | Harari et al. | |
| 7,356,679 B1 | * | 4/2008 | Le et al. ........................... | 713/1 |

FOREIGN PATENT DOCUMENTS

| | | |
|---|---|---|
| KR | 10-2001-0008379 A | 2/2001 |
| KR | 10-2007-0070122 A | 7/2007 |

\* cited by examiner

*Primary Examiner* — Mariela Reyes
(74) *Attorney, Agent, or Firm* — NSIP Law

(57) ABSTRACT

A computing system and a storage device are provided. A computing system includes a first storage media, a second storage media having an input/output speed slower than that of the first storage media, and a hybrid file system management unit to manage a first physical file system and second physical file system, and provide a virtual file system manager with a virtual file system converted from the first physical file system and second physical file system. The first physical file system controls the first storage media and the second physical file system controls the second storage media.

7 Claims, 15 Drawing Sheets

500

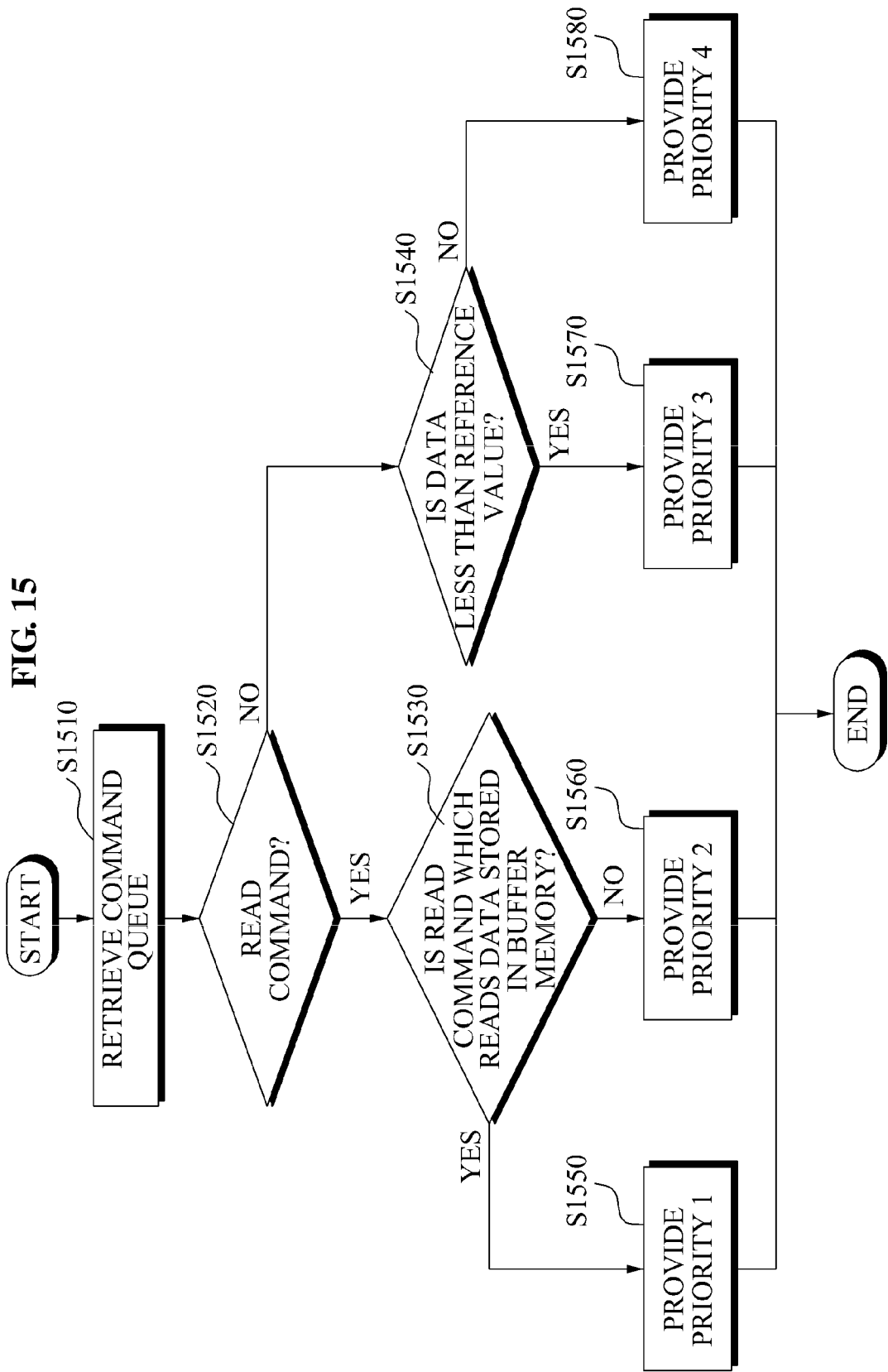

STORAGE DEVICE INCLUDING A FILE SYSTEM MANAGER FOR MANAGING MULTIPLE STORAGE MEDIA

CROSS-REFERENCE TO RELATED APPLICATION

This application claims the benefit under 35 U.S.C. §119 (a) of a Korean Patent Application No. 10-2008-0035475, filed on Apr. 17, 2008 in the Korean Intellectual Property Office, the entire disclosure of which is incorporated herein by reference.

TECHNICAL FIELD

The following description relates to a storage device, and more particularly, to a file system and a control method for a storage device.

BACKGROUND

Types of data storage device include a magnetic disk drive, a semiconductor memory, and the like. Since each type of data storage device may have different physical characteristics, a management system corresponding to physical characteristics of a particular data storage device is desirable.

A magnetic disk drive has been widely used as a conventional data storage device. Generally, a magnetic disk drive has an average read/write time in milliseconds per kilobyte. Also, since an arm is used to access data, another characteristic of a magnetic disk drive is that a read/write time may vary depending on the physical locations where the data is stored or to be written.

A host or processor may access a storage device in order to store data in the storage device or read data stored in the storage device. Since time for a host or processor to read data from the storage device may be relatively long, the host or processor may use a memory to store a portion of data stored in the storage device. Data input/output time with respect to a memory may be shorter than that of the storage device.

A host or processor may have a tendency to read again the read data within a short period of time. This tendency may be referred to as a temporal locality. In a conventional art, a storage device and management system may use a buffer memory that temporarily stores data read by a host or processor from the storage device.

SUMMARY

In one general aspect, there is provided a storage device and/or a computing system which uses a file system optimized for a non-volatile memory. Accordingly, a data input/output transmission rate may be increased.

In another general aspect, there is provided a storage device which controls the amount of a random write operation to be equal to or greater than a reference value. Accordingly, a data transmission rate of the random write operation may be increased.

In still another general aspect, there is provided a storage device which provides a file system optimized for a non-volatile memory with a relatively high data transmission rate of a random read operation.

In still another general aspect, there is provided a storage device which shares information about invalidation file with a host. Accordingly, a load due to a garbage collection may be reduced.

In still another general aspect, there is provided a storage device which stores and schedules a command received from a host. Accordingly, more data may be processed in parallel.

In still another general aspect, there is provided a storage device which uses a file system optimized for each of different types of storage media. Accordingly, a data transmission rate may be increased.

In still another general aspect, there is provided a storage device which selects a storage media storing a file based on an access frequency. Accordingly, a data transmission time may be reduced.

In still another general aspect, a computing system includes a first storage media, a second storage media having an input/output speed slower than that of the first storage media, and a hybrid file system management unit to manage a first physical file system and second physical file system, and provide a virtual file system manager with a virtual file system converted from the first physical file system and second physical file system, the first physical file system controlling the first storage media, the second physical file system controlling the second storage media.

The hybrid file system management unit may determine whether to move a file requested by an operating system from the first storage media to the second storage media or from the second storage media to the first storage media, based on an access frequency of the requested file.

Where the requested file is stored in the second storage media, the hybrid file system management unit may calculate a relative gain and cost with respect to the movement to the first storage media based on the access frequency, and where the calculated relative gain is greater than the calculated cost, may move the requested file to the first storage media.

The hybrid file system management unit may determine whether an available space exists in the first storage media before moving the requested file to the first storage media, select a file which is the least effective with regards to a cost from among files stored in the first storage media where the available space does not exist in the first storage media, move the selected file to the second storage media, and move the requested file to the first storage media from the second storage media.

In still another general aspect, a storage device includes a storage media to store first data and metadata of the first data, and a buffer memory to sequentially store data transmitted from a host to the storage media, wherein, where an amount of data stored in the buffer memory is equal to or greater than a reference value, the storage media stores the data stored in the buffer memory in a location next to the first data and the metadata of the first data as second data, and stores metadata of the second data in a location next to the second data.

The storage media may be a non-volatile memory, and the reference value may be equal to or greater than a garbage collection unit.

The storage media may notify the host of the garbage collection unit.

The storage media may perform a plurality of random write operations requested by the host, and enable the host to recognize the garbage collection unit, each of the plurality of random write operations being an operation to write data of different amounts.

The buffer memory may be a non-volatile memory.

The buffer memory may be located in the host, in the same package as the storage media, in a chipset associated with the host, or on a main board associated with the host In still another general aspect, a storage device includes a non-volatile memory to store data and metadata including management information of the data, and a controller to control the non-volatile memory using the metadata, store updated metadata in the non-volatile memory where the metadata is required to be updated, and invalidate previous metadata, wherein the controller receives information about data invalidated by a host from the host and manages the data of the non-volatile memory based on the received information.

Where a process performed by the host is terminated, the controller may receive invalidation information about storage space of the non-volatile memory from the host, the storage space being dynamically assigned to the process.

The controller may divide the storage space of the non-volatile memory into a data area and a swap area for a virtual memory function, and where the process is terminated, may invalidate data stored in the storage space assigned to the process in the swap area.

The controller may invalidate data stored in the storage space of the non-volatile memory, the storage space have been temporarily used by the process.

In still another general aspect, a storage device includes a plurality of memory channels, a command queue to sequentially receive at least one command from a host with respect to the plurality of memory channels and store the at least one command, and a controller to select a first command from the at least one command stored in the command queue, and issue the selected first command to a first channel from among the plurality of memory channels, wherein each of the plurality of memory channels includes at least one non-volatile memory unit.

The controller may check a state of the first channel where the selected first command is a write command, select a second command from the at least one command stored in the command queue where a garbage collection is performed in the first channel, and issue the selected second command to a second channel, the second command accessing the second channel.

The controller may select a third command from the at least one command stored in the command queue, and issue each of the selected second command and third command to the second channel and a third channel in parallel, the third command accessing the third channel.

The controller may select a command with a top priority as the first command from the at least one command stored in the command queue.

The controller may provide a higher priority to a read command from among the at least one command stored in the command queue than to a write command.

Each of the plurality of memory channels may comprise a buffer memory having an input/output speed faster than that of the at least one non-volatile memory unit, and the controller may provide a higher priority to a command which reads data stored in the buffer memory from among the at least one command stored in the command queue than to a command which reads data stored in the at least one non-volatile memory unit.

The controller may provide a higher priority to a command which writes less data than a reference value from among the at least one command stored in the command queue than to a command which writes more data than the reference value.

Each of the plurality of memory channels may comprise a buffer memory having an input/output speed faster than that of the at least one non-volatile memory unit, and the controller may store data of the command which writes the less data than the reference value in the buffer memory, and store data of the command which writes the more data than the reference value in the at least one non-volatile memory unit.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 15 is a flowchart illustrating an operation of the storage device of FIG. 10 according to still another exemplary embodiment.

Throughout the drawings and the detailed description, unless otherwise described, the same drawing reference numerals will be understood to refer to the same elements, features, and structures. The elements may be exaggerated for clarity and convenience.

DETAILED DESCRIPTION

Figure 1:
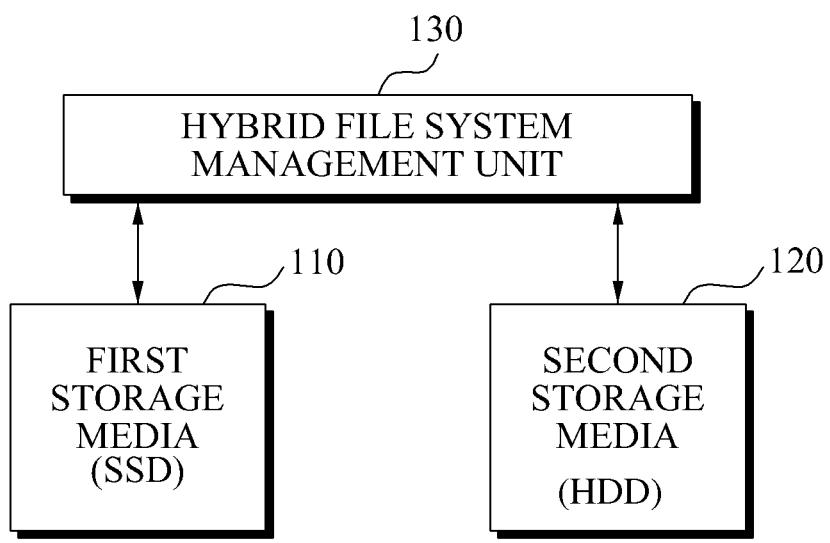
FIG. 1 is a diagram illustrating a computing system according to an exemplary embodiment.

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

A magnetic disk drive used as a storage device includes a floppy disk drive or a hard disk drive (HDD), and the like. Because of the storage capacity, an HDD has been widely adopted. Typically, an arm accesses a rotating magnetic disk in an HDD, and the HDD reads data from a track of the magnetic disk or stores data in the track.

In an initial booting process of a computing system, a booting time of the computing system using an HDD may be long due to a time for a magnetic disk to rotate and data read time which is relatively longer than that of a semiconductor memory.

In an HDD, where a rotation speed of a magnetic disk reaches a predetermined level, for example, 6000 rpm (revolutions per minute), an input/output of data may be stable. Accordingly, when booting, a time for accelerating the rotation of the magnetic disk may be needed until the rotation speed of the magnetic disk reaches the predetermined level.

Also, when booting, a time for loading data stored in the HDD to a main memory may be needed. Since a relatively longer data read time is needed in the HDD, in comparison to a semiconductor memory, the time for loading the data stored in the HDD when booting may be long.

Where the main memory is a volatile memory, data may be required to be frequently stored in the HDD to maintain data consistency. Since the HDD uses the rotation of the magnetic disk, a relatively longer time for inputting and/or outputting data may be needed. The HDD may access data through an operation where a head, located at an end of an arm of the HDD, moves to a location of a desired track or sector. Accordingly, where inputting and/or outputting random data, referred to as random I/O, performance may be degraded.

Since the size of the main memory is generally smaller than that of the storage device, memory required by an application may be larger than the amount available in the main memory. A page swapping refers to an operation of fetching data required by a host from a storage device, and evicting data with a location of the fetched data from the main memory. A speed of the page swapping may be determined by an operation speed of a device that has a slower operation speed from among the main memory and the storage device. Generally, a slower speed of the storage device may determine the speed of the page swapping.

Where data, stored in the main memory, which is a volatile memory, is updated, the data stored in the storage device may be required to be updated. This may be referred to as a write-through scheme. In this case, the data stored in the storage device corresponds to the data stored in the main memory. That is, every time the data stored in the main memory is updated, the data stored in the storage device is updated using a write-through scheme. In a write-back scheme, data is marked where data stored in the main memory is updated. The data stored in the storage device may be updated at regular intervals or when a number of the update mark is greater than a predetermined number in the write-back scheme. The write-back scheme may be referred to as a write-behind scheme. Where the data stored in the main memory is updated, the data stored in the main memory may be referred to as being dirty.

Since data to be updated from among data, stored in a memory, generally has high temporal locality, the data may be updated frequently and rapidly. In this case, data stored in the same location may be repeatedly stored in the storage device, and thus a slow operation speed of the storage device, that is, the HDD, may decrease an operation speed of a computing system using the same.

An HDD may consume a relatively large amount of power while being mechanically operated, for example, where a disk is rotated or an arm is moved. Although a number of times that the HDD is used may be a portion of the entire application, a method of cutting power supply with respect to the HDD has been provided when HDD is not in use. However, since a large amount of power is consumed when the HDD is operated again after the power off, a dynamic power management scheme which controls a rotation speed of an HDD disk may be used.

In a dynamic random access memory (DRAM) widely used for a main memory, a large amount of power may be consumed due to an operation of refreshing data stored in a memory cell at regular intervals. According to an exemplary embodiment, power consumption of a computing system may be reduced by using a non-volatile memory consuming less power than a volatile memory.

A solid state disk (SSD) may be used as a mass storage device using a non-volatile memory. The SSD may transmit data in parallel using a plurality of channels, and each of the plurality of channels may independently perform an operation. A single channel may include a plurality of memory banks. The SSD may increase throughput of data using the plurality of memory banks.

Since, unlike an HDD, the SSD does not perform a mechanical operation, the SSD may consume less power than the HDD, and generate less noise than the HDD when operated.

The HDD accesses data by moving an arm, and as described above, a relatively longer time may be needed to perform a random write or random read operation. Since the SSD does not perform a mechanical operation, a difference between time for a sequential read operation and time for a random write operation may be less than that of the HDD.

FIG. 1 illustrates a computing system 100 according to an exemplary embodiment.

Referring to FIG. 1, the computing system 100 comprises a first storage media 110, a second storage media 120, and a hybrid file system management unit 130.

The second storage media 120 has an input/output speed slower than that of the first storage media 110.

The hybrid file system management unit 130 manages a first physical file system and a second physical file system. The first physical file system controls the first storage media 110, and the second physical file system controls the second storage media 120. Also, the hybrid file system management unit 130 provides a virtual file system manager with a virtual file system converted from the first physical file system and second physical file system.

The first storage media 110 may be of a different type from the second storage media 120. For example, the first storage media 110 may be an SSD, and the second storage media 120 may be an HDD.

A host or processor may include the hybrid file system management unit 130. The virtual file system manager may be included in the host or processor, and control the virtual file system.

Figure 2:
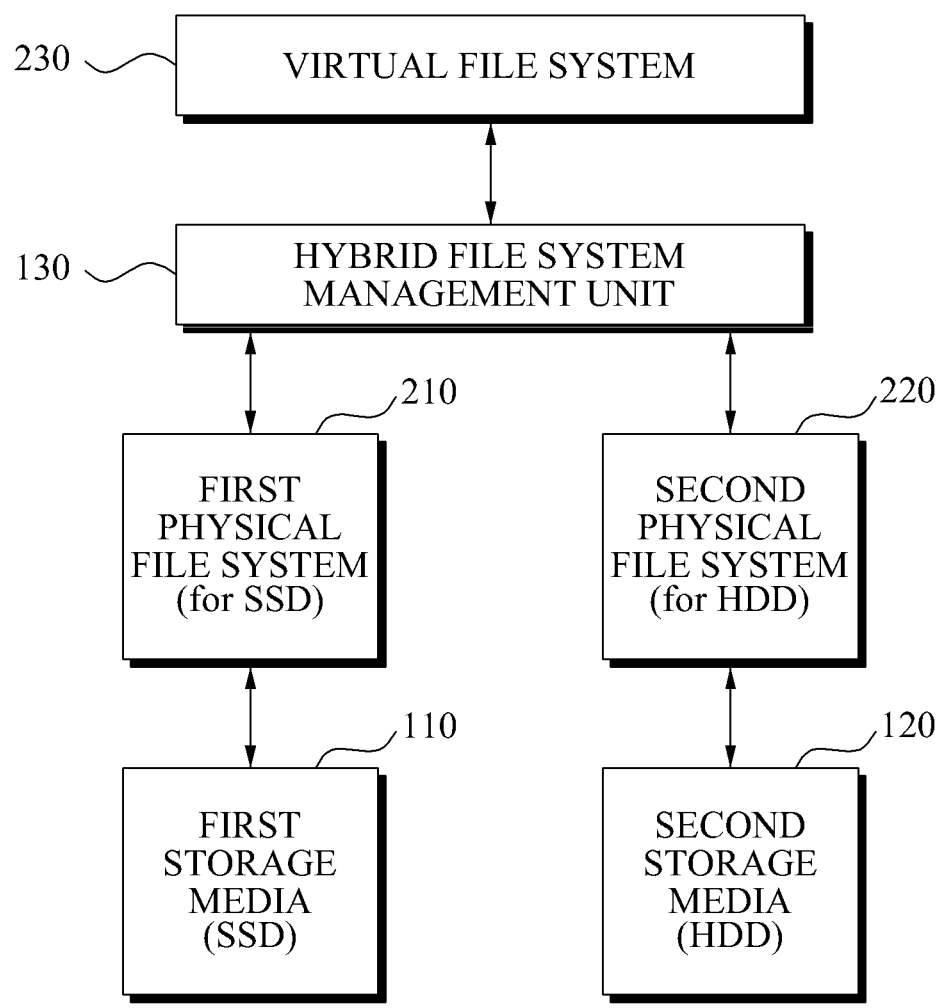
FIG. 2 is a diagram illustrating an operation of the computing system of FIG. 1 according to an exemplary embodiment.

FIG. 2 illustrates an operation of the computing system 100 of FIG. 1 according to an exemplary embodiment.

Referring to FIG. 2, the hybrid file system management unit 130 manages a first physical file system 210 controlling the first storage media 110, and a second physical file system 220 controlling the second storage media 120. Where the first storage media 110 is an SSD, the first physical file system 210 may be optimized for the SSD. Where the second storage media 120 is an HDD, the second physical file system 220 may be optimized for the HDD.

The hybrid file system management unit 130 may convert a file of the first physical file system 210 into a format that may be used in a virtual file system 230, and convert a file of the virtual file system 230 into a format that may be used in the first physical file system 210. The hybrid file system management unit 130 may convert a file of the second physical file system 220 into a format that may be used in the virtual file system 230, and convert the file of the virtual file system 230 into a format that may be used in the second physical file system 220.

The hybrid file system management unit 130 may convert the file of the virtual file system 230 into a format that may be used in the first physical file system 210 or second physical file system 220 depending on an address of the file of the virtual file system 230.

The hybrid file system management unit 130 may provide a host with the virtual file system 230 which may be recognized by the host regardless of whether a storage media existing in a lower layer is the first storage media 110 or second storage media 120.

The hybrid file system management unit 130 may migrate a file requested by an operating system between the first physical file system 210 and second physical file system 220 based on an access frequency of the requested file. The hybrid file system management unit 130 may determine whether to move the requested file from the first storage media 110 to the second storage media 120 or from the second storage media 120 to the first storage media 110, based on the access frequency.

Figure 3:
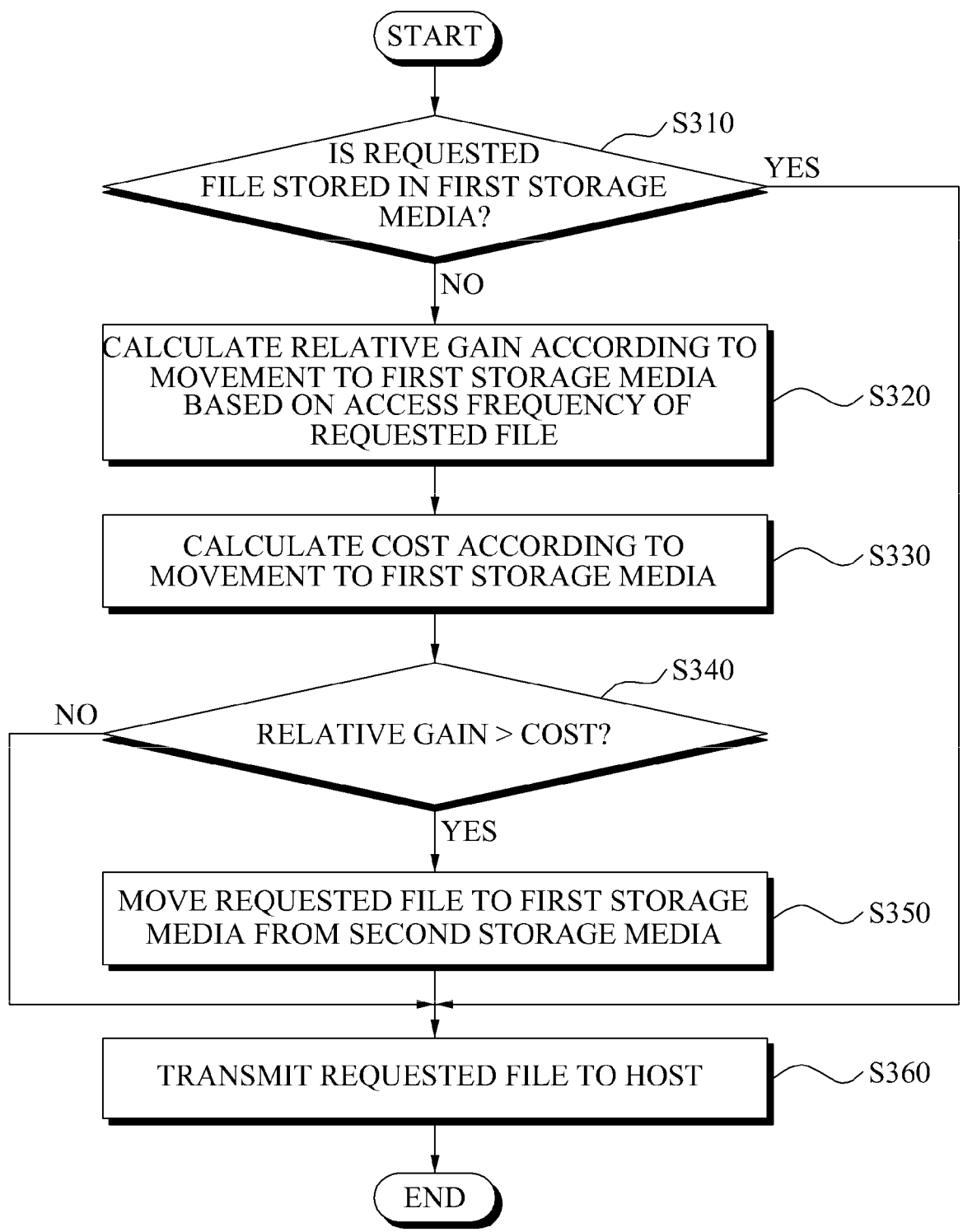
FIG. 3 is a flowchart illustrating an operation of a hybrid file system management unit of FIG. 1 according to an exemplary embodiment.

FIG. 3 illustrates an operation of the hybrid file system management unit 130 of FIG. 1 according to an exemplary embodiment.

Referring to FIG. 3, in operation S310, the hybrid file system management unit 130 determines whether a file requested by an operating system is stored in the first storage media 110.

In operation S320, where the requested file is stored in the second storage media 120, the hybrid file system management unit 130 calculates a relative gain according to the movement to the first storage media 110 based on an access frequency of the requested file. As an example of the relative gain, the hybrid file system management unit 130 may calculate the relative gain by multiplying the access frequency and a difference between a data transmission time from the first storage media 110 to a host and a data transmission time from the second storage media 120 to the host. The access frequency may be a number of times that the requested file is accessed in a predetermined period. The calculated relative gain may be a reduced time of access time which may occur in the predetermined period with respect to the requested file.

In operation S330, where the requested file is stored in the second storage media 120, the hybrid file system management unit 130 calculates a cost according to the movement to the first storage media 110. The hybrid file system management unit 130 may calculate the cost based on a size of the requested file and a write speed of the first storage media 110.

In operation S340, the hybrid file system management unit 130 determines whether the calculated relative gain is greater than the calculated cost.

In operation S350, where the calculated relative gain is greater than the calculated cost, the hybrid file system management unit 130 moves the requested file to the first storage media 110 from the second storage media 120.

In operation S360, the hybrid file system management unit 130 transmits the requested file, which is moved from the second storage media 120, to the host.

Where the requested file is stored in the first storage media 110, in the operation S360, the hybrid file system management unit 130 may transmit the requested file to the host.

In the operation S360, where the calculated relative gain is not greater than the calculated cost in the operation S340, the hybrid file system management unit 130 transmits the requested file in the second storage media 120 to the host without moving the requested file to the first storage media 110.

Figure 4:
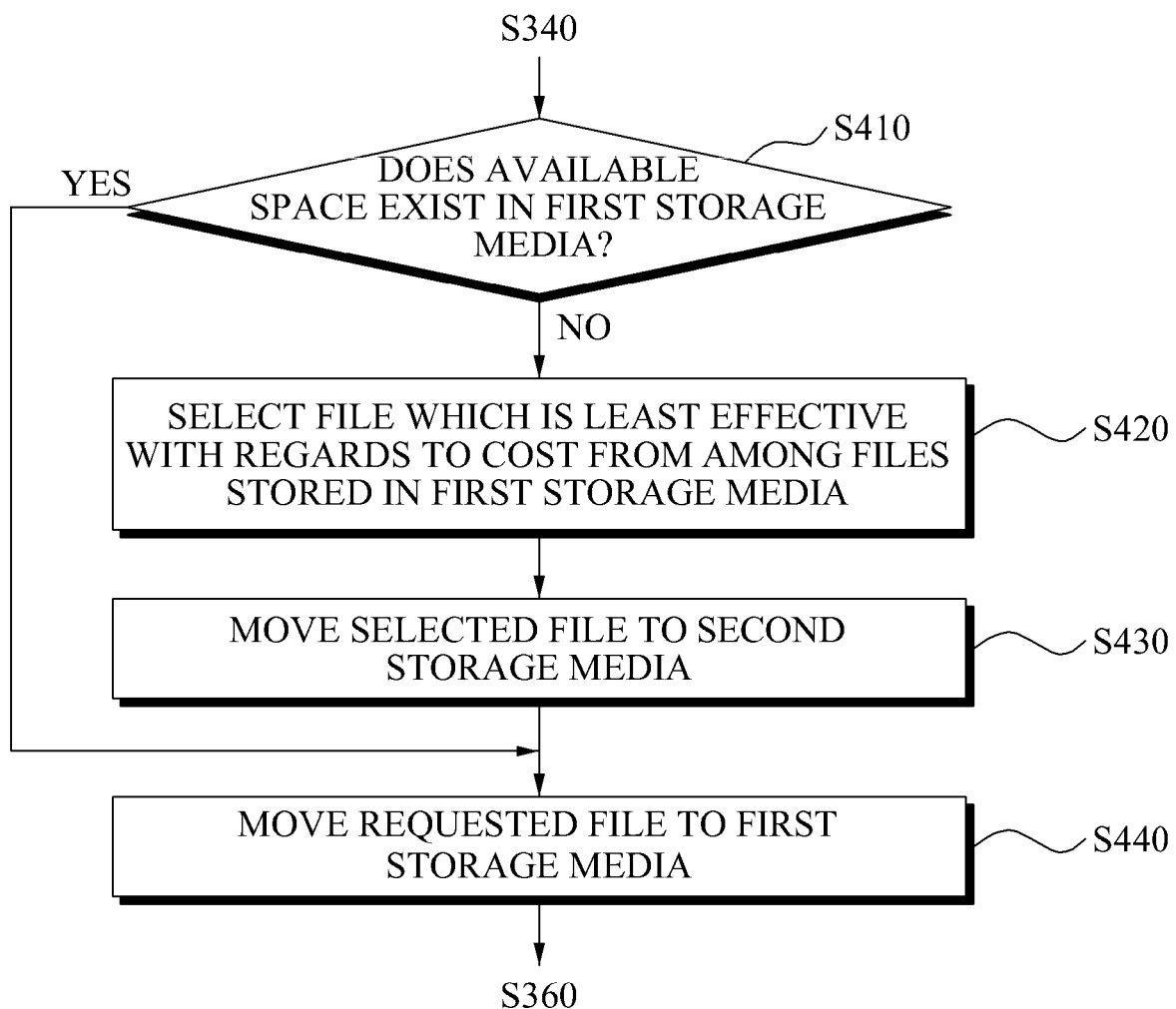
FIG. 4 is a flowchart illustrating a moving operation S350 of FIG. 3 according to an exemplary embodiment.

FIG. 4 further illustrates the operation S350 of FIG. 3 according to an exemplary embodiment.

Referring to FIG. 4, in operation S410, the hybrid file system management unit 130 determines whether available space exists in the first storage media 110. The hybrid file system management unit 130 may determine whether a proportion of entire space with regards to the available space is equal to or greater than a reference value. In this case, the entire space is the first storage media 110. Where the proportion is equal to or greater than the reference value, the hybrid file system management unit 130 may determine that the available space exists in the first storage media 110.

In operation S420, where the available space does not exist in the first storage media 110, the hybrid file system management unit 130 selects a file which is the least effective with regards to a cost from among files stored in the first storage media 110. The hybrid file system management unit 130 may calculate an effect with regards to cost of each of the files based on an access frequency and size of each of the files.

In operation S430, the hybrid file system management unit 130 moves the selected file to the second storage media 120.

In operation S440, the hybrid file system management unit 130 moves the requested file to the first storage media 110.

In the operation S440, where the available space exists in the first storage media 110, the hybrid file system management unit 130 may move the requested file to the first storage media 110.

Operations S410 through S440 may be applicable in an operation where the host writes a file in the first storage media 110.

Figure 5:
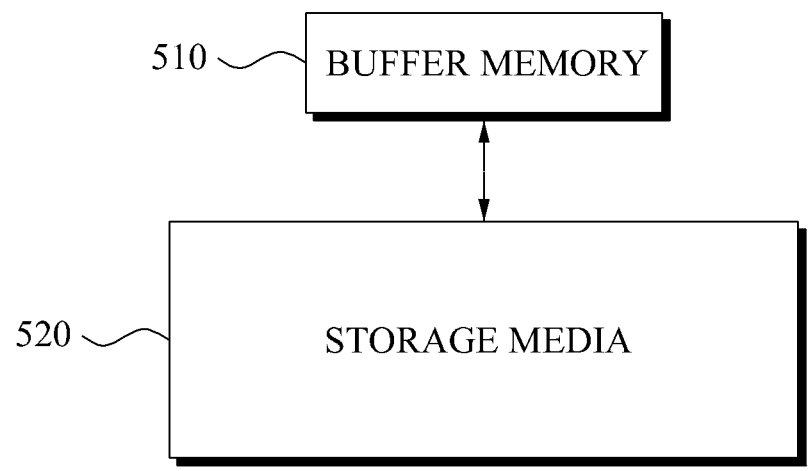
FIG. 5 is a diagram illustrating a storage device according to an exemplary embodiment.

FIG. 5 illustrates a storage device 500 according to an exemplary embodiment.

Referring to FIG. 5, the storage device 500 comprises a buffer memory 510 and a storage media 520.

The storage media 520 stores first data and metadata of the first data. The metadata of the first data may include management information about the first data.

The buffer memory 510 sequentially stores data transmitted to the storage media 520 from a host.

Where an amount of the data stored in the buffer memory 510 is equal to or greater than a reference value, the storage media 520 may store the data stored in the buffer memory 510 in a location next to the first data and the metadata of the first data as second data. After storing the second data, the storage media 520 may store metadata of the second data in a location next to the second data.

The storage media 520 may provide a file system storing data and metadata by predetermined unit. The predetermined unit may correspond to the reference value.

The file system is managed by the host, and the storage device 500 may store the data and metadata under a control of the host.

A random read operation may be frequently performed in the file system provided by the storage media 520. The file system may be suitable for an SSD where a performance of the random read operation is not significantly degraded. The performance of the random read operation may be measured using a data access speed, throughput, and the like.

The data and metadata may be stored by a predetermined unit in the file system provided by the storage media 520. A performance of a random write operation with respect to the SSD may be lower than that of a sequential write operation. However, as an amount of data of the random write operation increases, the performance of the random write operation may increase.

In the file system provided by the storage media 520, a size of a unit to store the data and metadata may be controlled by controlling the reference value. The storage media 520 may increase the performance of the random write operation by controlling the reference value.

Where the storage media 520 is a non-volatile memory, a garbage collection may be performed to obtain available space in the storage media 520. The garbage collection may be performed by a unit being k times greater than a non-volatile memory block. In the file system, as the unit to store the data and metadata increases, the performance of the random write operation increases. However, where the unit is greater than a unit to perform the garbage collection, the amount of increase of the performance of the random write operation may decrease.

The storage media 520 may set the reference value to be identical to a garbage collection unit of the storage media 520. Alternatively, the storage media 520 may set the reference value to be greater than the garbage collection unit of the storage media 520.

Where the host effectively uses the file system of the storage media 520, the host may be required to control the garbage collection unit of the storage media 520.

The storage media 520 may notify the host of the garbage collection unit.

Alternatively, the host may request the storage media 520 for a plurality of random write operations. The storage media 520 performs the plurality of requested random write operations, and thereby may enable the host to recognize the garbage collection unit. Each of the plurality of random write operations writes data of different amounts. The host may recognize the garbage collection unit of the storage media 520 based on a response time to each of the plurality of random write operations.

Depending on an embodiment, the buffer memory 510 may be a non-volatile memory. The buffer memory 510 may be a non-volatile memory accessible by byte. The buffer memory 510 may be a non-volatile random access memory (NVRAM).

Depending on an embodiment, the buffer memory 510 may be located in the host, or in the storage media 520 as a single unit.

Depending on an embodiment, the buffer memory 510 may be located in a chipset associated with the host, or on a main board associated with the host.

Figure 6:
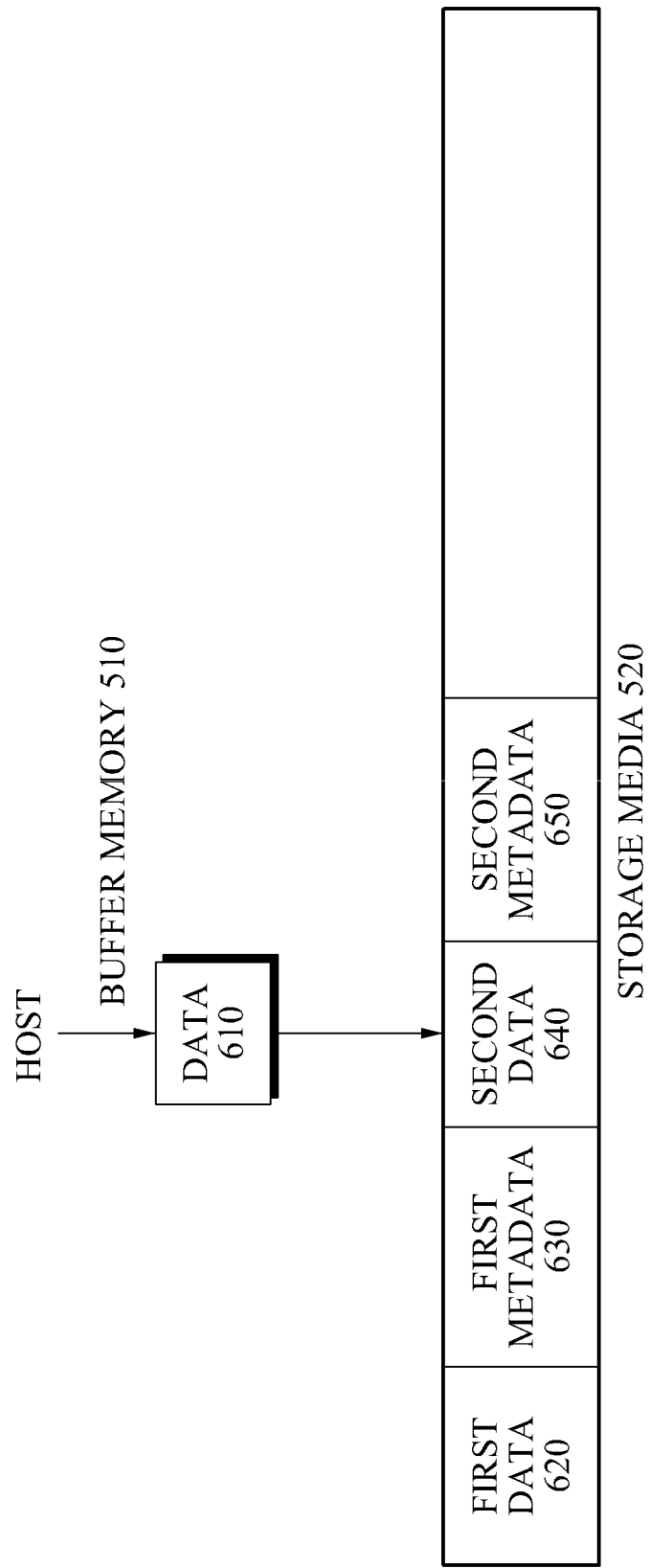
FIG. 6 is a diagram illustrating an operation of the storage device of FIG. 5 according to an exemplary embodiment.

FIG. 6 illustrates an operation of the storage device 500 of FIG. 5 according to an exemplary embodiment.

Referring to FIG. 6, the buffer memory 510 sequentially stores data transmitted from the host. Where an amount of data 610 stored in the buffer memory 510 is equal to or greater than a reference value, the storage media 520 may store the data 610 as second data 640.

The storage media 520 stores first data 620 and first metadata 630. The first metadata 630 may include management information about the first data 620.

The storage media 520 stores the second data 640 in a location next to or following the first metadata 630. The storage media 520 stores the second metadata 650 in a location next to the second data 640 after storing the second data 640. The second metadata 650 may include management information about the second data 640.

A file system provided by the storage device 500 may be used as the first physical file system 210 of FIG. 2. Where the storage media 110 is an SSD, the file system provided by the storage device 500 may be used as the first physical file system 210 optimized to the SSD.

Figure 7:
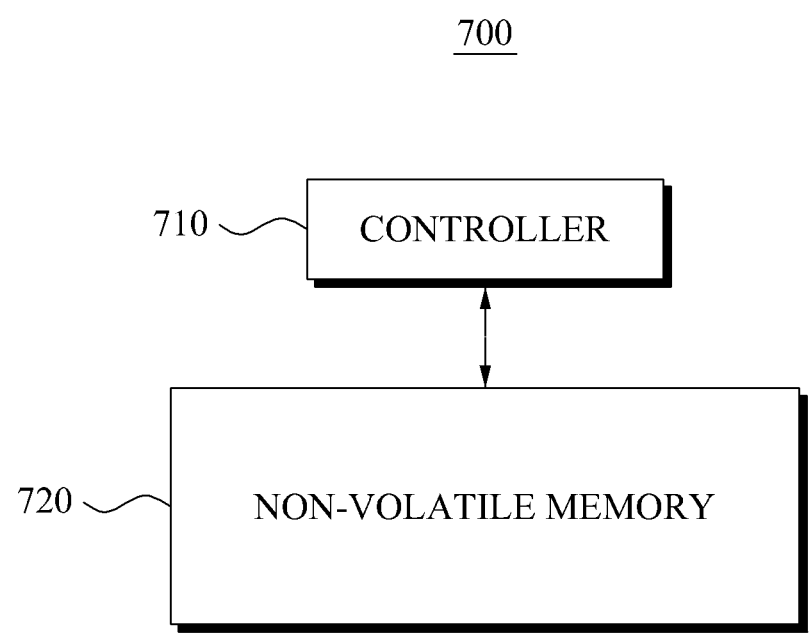
FIG. 7 is a diagram illustrating a storage device according to another exemplary embodiment.

FIG. 7 illustrates a storage device 700 according to another exemplary embodiment.

Referring to FIG. 7, the storage device 700 comprises a controller 710 and a non-volatile memory 720.

The non-volatile memory 720 stores data and metadata including management information about the data.

The controller 710 controls the non-volatile memory 720 using the metadata. Where the metadata is required to be updated, the controller 710 may store updated metadata in the non-volatile memory 720, and invalidate previous metadata.

The controller 710 may receive information about invalidated data from a host and manage the data of the non-volatile memory 720 based on the received information.

Where a process performed by the host is terminated, the controller 710 may receive from the host invalidation information about a storage space of the non-volatile memory 720. In this case, the storage space is dynamically assigned to the process. The controller 710 may invalidate the storage space of the non-volatile memory 720 based on the received invalidation information.

The storage device 700 may share validation/invalidation information about the data stored in the non-volatile memory 720 with the host, and accordingly, the non-volatile memory 720 may be easily managed. The storage device 700 may reduce a time to perform a garbage collection with respect to the non-volatile memory 720 based on the invalidation information received from the host. The storage device 700 may not copy the data invalidated by the host during the garbage collection. Accordingly, load due to the garbage collection may be reduced.

Figure 8:
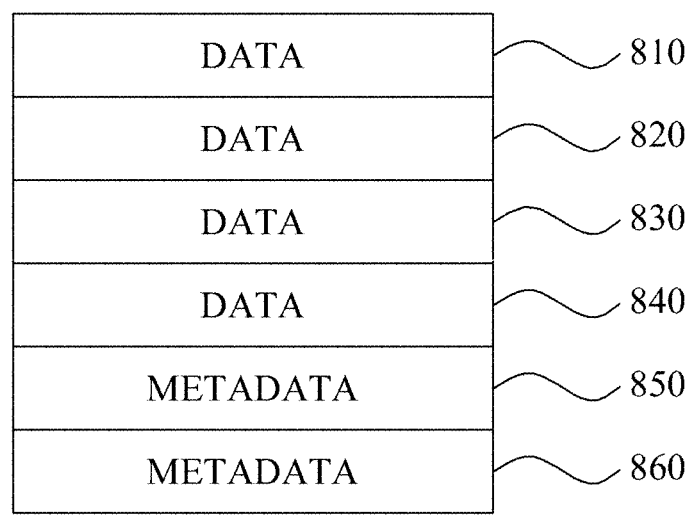
FIG. 8 is a diagram illustrating data stored in a single block of non-volatile memory of FIG. 7 according to an exemplary embodiment.

FIG. 8 illustrates data stored in a single block of the non-volatile memory 720 of FIG. 7 according to an exemplary embodiment.

Referring to FIG. 8, the single block of the non-volatile memory 720 comprises six pages 810, 820, 830, 840, 850, and 860.

Where a data write command is received from the host, the controller 710 stores data in the first page 810, second page 820, third page 830, and fourth page 840. The controller 710 may store metadata of the data, stored in the first page 810, second page 820, third page 830, and fourth page 840, in the fifth page 850.

Where a delete command with respect to the data stored in the first page 810, second page 820, third page 830, and fourth page 840 is received from the host, the controller 710 may store updated metadata in the sixth page 860. The metadata stored in the sixth page 860 may indicate that metadata stored in the fifth page 850 is invalid.

The host may transmit to the controller 710 invalidation information of the data stored in the first page 810, second page 820, third page 830, and fourth page 840. The controller 710 may manage the data stored in the first page 810, second page 820, third page 830, and fourth page 840 based on the received invalidation information.

The controller 710 may erase the block without copying the data stored in the first page 810, second page 820, third page 830, and fourth page 840 based on the invalidation information received from the host during the garbage collection with respect to the non-volatile memory 720. In this case, the controller 710 may erase the block without copying the metadata stored in the fifth page 850 based on the metadata stored in the sixth page 860.

Figure 9:
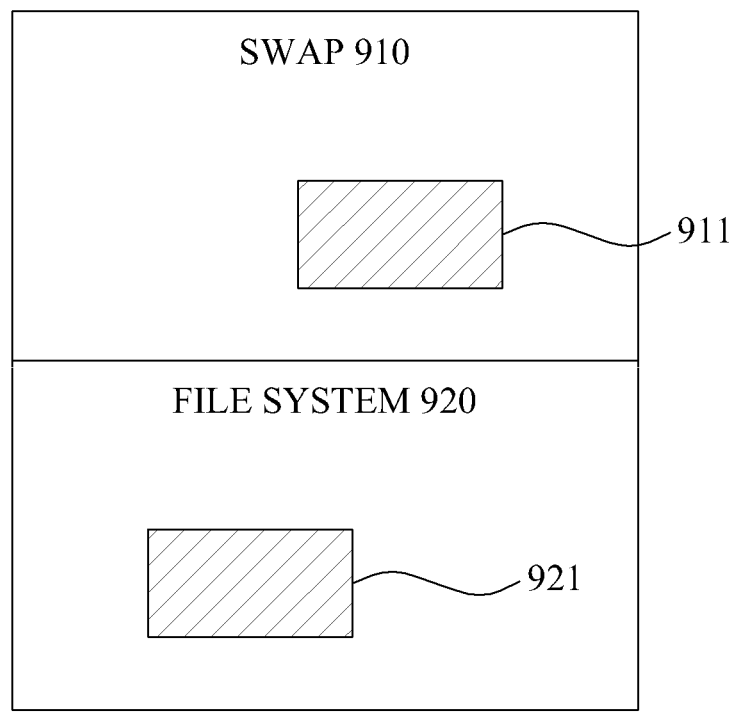
FIG. 9 is a diagram illustrating an operation of the storage device of FIG. 7 according to an exemplary embodiment.

FIG. 9 illustrates an operation of the storage device 700 of FIG. 7 according to an exemplary embodiment.

Referring to FIG. 9, the controller 710 divides the storage space of the non-volatile memory 720 into a swap area 910 and a file system area 920. The file system area 920 may be referred to as a data area. The swap area 910 is for a virtual memory function, and the file system area 920 is for storing data.

The controller 710 may dynamically assign an area 911 of the swap area 910 to the process performed by the host. Where the process is terminated, the controller 710 may invalidate data stored in the area 911 assigned to the process. The controller 710 may receive invalidation information about the area 911 or process termination information from the host. The controller 710 may invalidate the data stored in the area 911 based on the invalidation information of the area 911 or process termination information received from the host.

The controller 710 may assign an area 921 of the file system area 920 to a file which is temporarily used by the process. Where the process is terminated, the controller 710 may invalidate data stored in the area 921 assigned to the file temporarily used by the process.

Figure 10:
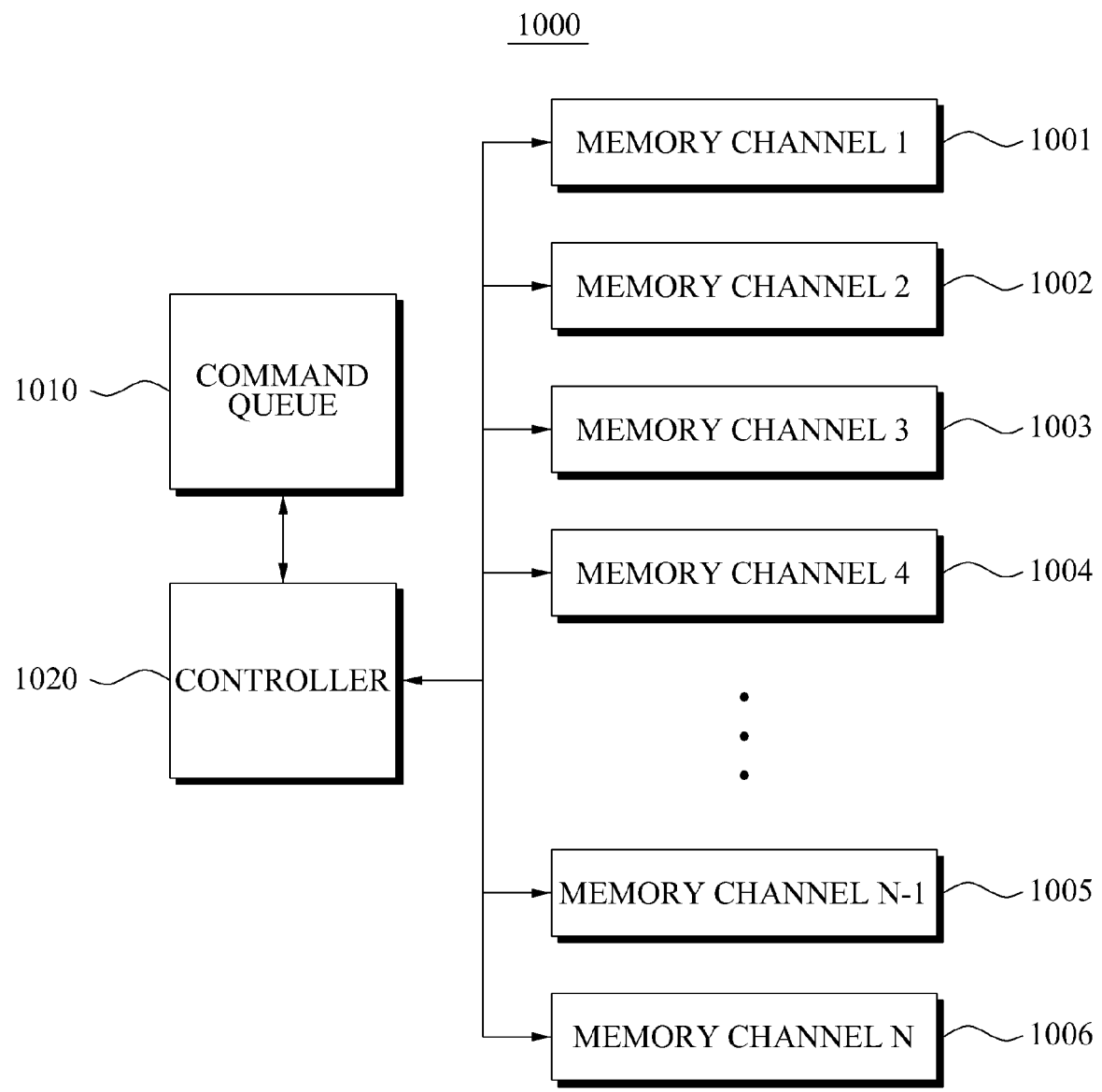
FIG. 10 is a diagram illustrating a storage device according to still another exemplary embodiment.

FIG. 10 illustrates a storage device 1000 according to another exemplary embodiment.

As illustrated in FIG. 10, the storage device 1000 comprises a command queue 1010, controller 1020, and N memory channels 1001, 1002, 1003, 1004, 1005, and 1006.

The command queue 1010 sequentially receives and stores at least one command with respect to the N memory channels 1001, 1002, 1003, 1004, 1005, and 1006. The at least one command may be issued from a host.

The controller 1020 selects a first command from the at least one command stored in the command queue 1010. The controller 1020 may retrieve and select a command which is first received, from the command queue 1010, as the first command. Alternatively, the controller 1020 may select a command with a top priority based on a predetermined priority level as the first command.

The controller 1020 issues the first command to a first channel. The first channel is accessed by the first command from among the N memory channels 1001, 1002, 1003, 1004, 1005, and 1006.

Each of the N memory channels 1001, 1002, 1003, 1004, 1005, and 1006 may include at least one non-volatile memory unit.

Depending on an embodiment, the storage device 1000 may be an SSD including the N memory channels 1001, 1002, 1003, 1004, 1005, and 1006. The storage device 1000 includes the command queue 1010 which sequentially receives and stores the at least one command. Accordingly, a command from the host may be processed in parallel.

Figure 11:
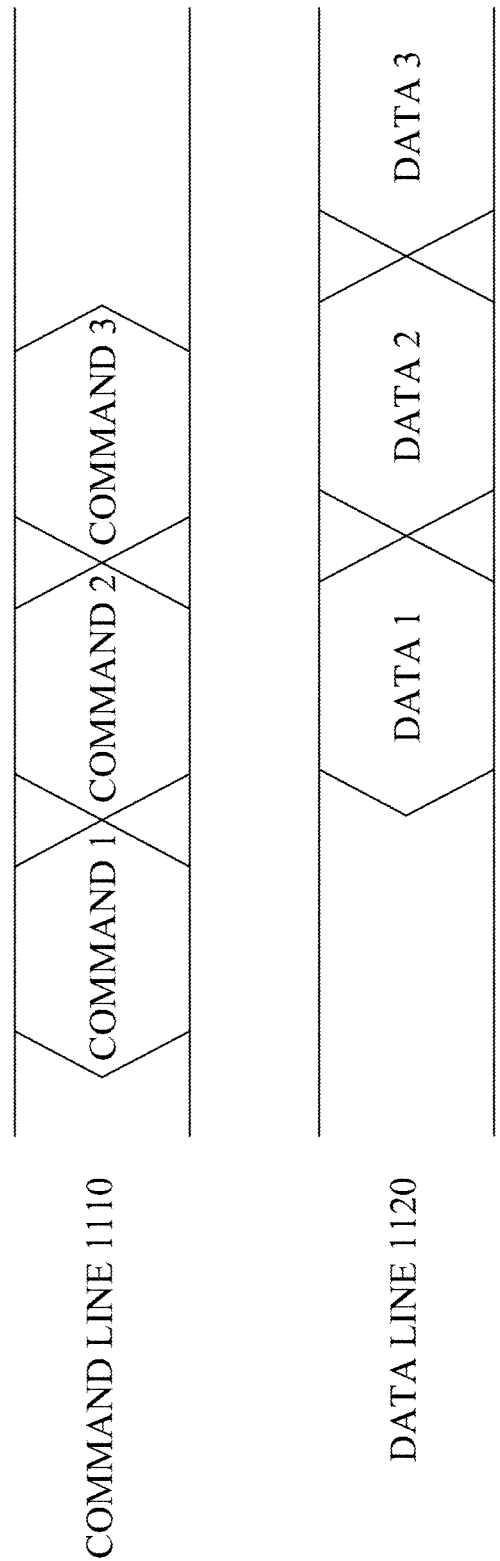
FIG. 11 is a timing diagram illustrating an operation of the storage device of FIG. 10 according to an exemplary embodiment.

FIG. 11 illustrates an operation of the storage device 1000 of FIG. 10 according to an exemplary embodiment.

Referring to FIG. 11, three read commands are issued to the storage device 1000 from the host via a command line 1110.

For example, a command 1 is a read command accessing the memory channel 1 1001, a command 2 is a read command accessing the memory channel 2 1002, and a command 3 is a read command accessing the memory channel 3 1003.

The host may sequentially issue the command 1, command 2, and command 3 to the storage device 1000 via the command line 1110. The command queue 1010 may sequentially store the issued command 1, command 2, and command 3. The controller 1020 may issue the command 1 to the memory channel 1 1001, the command 2 to the memory channel 2 1002, and command 3 to the memory channel 3 1003.

Each of the N memory channels 1001, 1002, 1003, 1004, 1005, and 1006 may independently perform a command. The memory channel 1 1001 first receiving the command 1 may transmit data 1 corresponding to the command 1 to the host via a data line 1120. The memory channel 2 1002 may transmit data 2 corresponding to the command 2 to the host after the data 1 is completely transmitted. The memory channel 3 1003 may transmit data 3 corresponding to the command 3 to the host after the data 2 is completely transmitted.

The storage device 1000 includes the N memory channels 1001, 1002, 1003, 1004, 1005, and 1006 which enable the host to issue the command 2 without waiting for the data 1 corresponding to the command 1 and are operated in parallel. Accordingly, a data transmission bandwidth may be increased.

Figure 12:
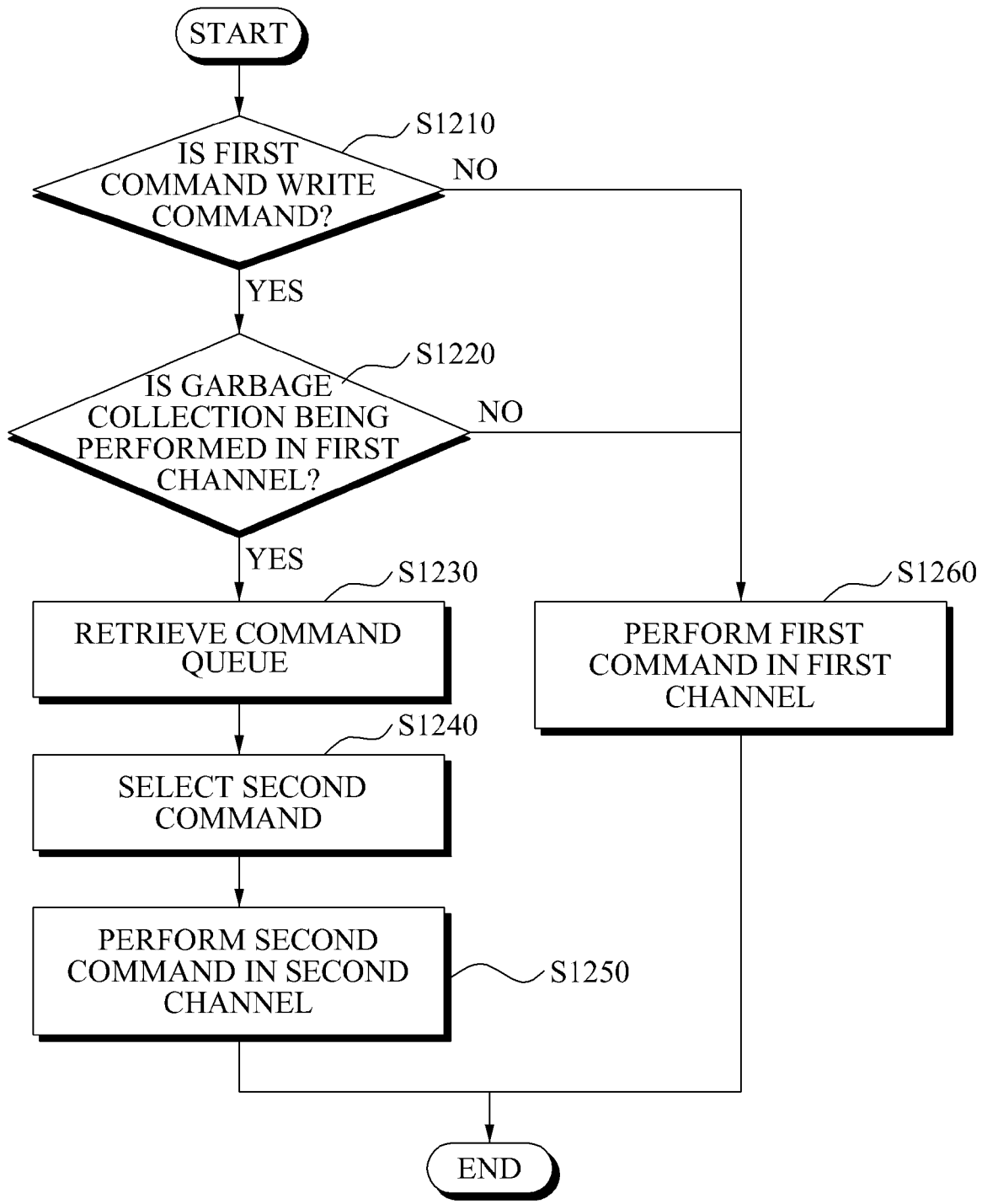
FIG. 12 is a flowchart illustrating an operation of the storage device of FIG. 10 according to another exemplary embodiment.

FIG. 12 illustrates an operation of the storage device 1000 of FIG. 10 according to another exemplary embodiment.

Referring to FIG. 12, in operation S1210, the storage device 1000 determines whether the selected first command is a write command.

In operation S1220, where the selected first command is the write command, the storage device 1000 determines whether a garbage collection is being performed in a first channel.

In operation S1230, where the garbage collection is performed in the first channel, the storage device 1000 retrieves a command queue 1010.

In operation S1240, the storage device 1000 selects a second command from at least one command stored in the command queue 1010. The second command accesses a second channel. The storage device 1000 issues the selected second command to the second channel.

In operation S1250, the storage device 1000 performs the selected second command in the second channel.

In operation S1260, where the first command is a read command as opposed to the write command, the storage device 1000 performs the first command in a first channel.

In the operation S1260, where the first command is the write command and the garbage collection is not performed in the first channel, the storage device 1000 performs the first command in the first channel.

In the operation S1240, the storage device 1000 may select a third command accessing a third channel. The storage device 1000 may issue the second command to the second channel, and the third command to the third channel in parallel.

The storage device 1000 may perform the second command in the second channel, and the third command in the third channel in parallel.

In the operation S1260, the storage device 1000 may select a fourth command accessing a fourth channel from the least one command stored in the command queue 1010, while the first command is performed in the first channel.

The storage device 1000 may issue the fourth command to the fourth channel, and perform the fourth command in the fourth channel while the first command is performed in the first channel.

Each memory channel may include a plurality of memory banks. The storage device 1000 may issue a command with respect to each memory bank in parallel, and perform the command with respect to each of the memory banks in parallel.

Figure 13:
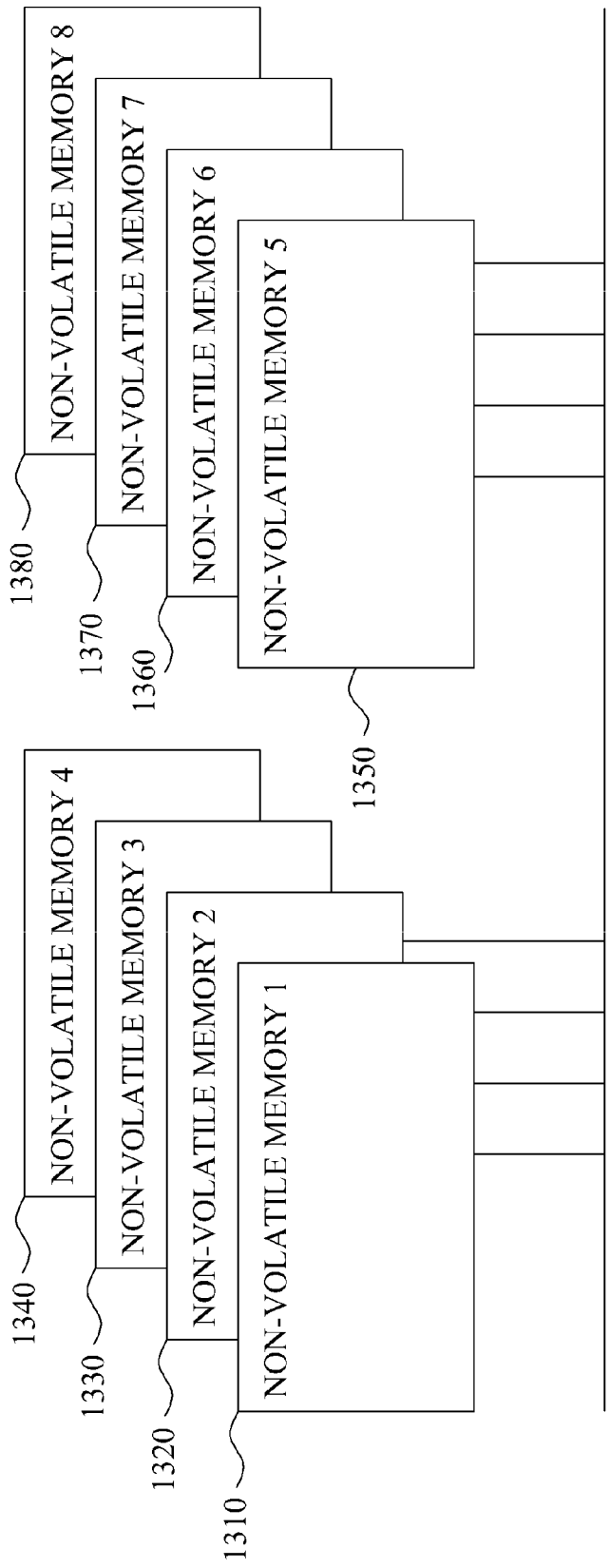
FIG. 13 is a diagram illustrating a memory channel 1 of FIG. 10 according to an exemplary embodiment.

FIG. 13 illustrates a memory channel 1 1001 of FIG. 10 according to an exemplary embodiment.

Referring to FIG. 13, the memory channel 1 1001 comprises eight non-volatile memories 1310, 1320, 1330, 1340, 1350, 1360, 1370, and 1380 connected to a common data bus.

A memory group 1 may include the non-volatile memory 1 1310, non-volatile memory 2 1320, non-volatile memory 3 1330, and non-volatile memory 4 1340. A memory group 2 may include the non-volatile memory 5 1350, non-volatile memory 6 1360, non-volatile memory 7 1370, non-volatile memory 8 1380.

Figure 14:
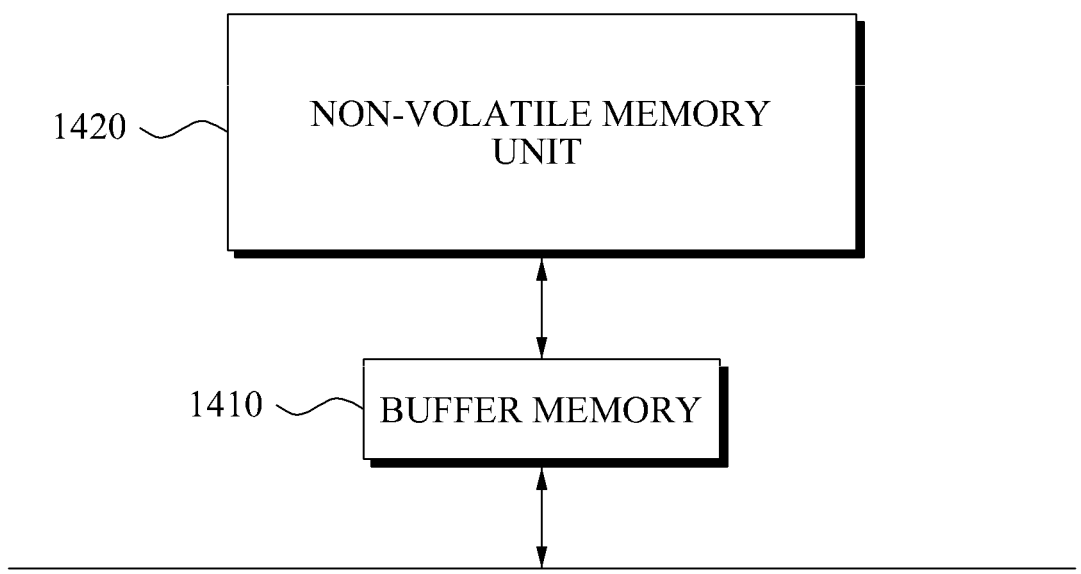
FIG. 14 is a diagram illustrating a non-volatile memory 1 of FIG. 13 according to an exemplary embodiment.

FIG. 14 illustrates a non-volatile memory 1 1310 of FIG. 13 according to an exemplary embodiment.

Referring to FIG. 14, the non-volatile memory 1 1310 comprises a buffer memory 1410 and a non-volatile memory unit 1420.

The buffer memory 1410 may have a data input/output speed faster than that of the non-volatile memory unit 1420.

The buffer memory 1410 may store data accessed by a host from among data stored in the non-volatile memory unit 1420.

FIG. 15 illustrates an operation of the storage device 1000 of FIG. 10 according to still another exemplary embodiment.

Referring to FIG. 15, in operation S1510, the storage device 1000 retrieves a command from a command queue 1010.

In operation S1520, the storage device 1000 selects a command from commands stored in the command queue 1010, and determines whether the selected command is a read command.

In operation S1530, where the selected command is the read command, the storage device 1000 determines whether the selected command is a read command which reads the data stored in the buffer memory 1410.

In operation S1550, where the selected command is the read command which reads the data stored in the buffer memory 1410, the storage device 1000 provides a priority 1 to the selected command.

In operation S1560, where the selected command is a read command which reads the data stored in the non-volatile memory unit 1420, the storage device 1000 provides a priority 2 to the selected command.

The storage device 1000 may provide a higher priority to a read command which may read the data stored in the buffer memory 1410 than to a read command which reads the data stored in the non-volatile memory unit 1420 from among the at least one command stored in the command queue 1010. The priority 1 may have a higher priority than the priority 2.

In the operation S1540, where the selected command is a write command, the storage device 1000 determines whether an amount of data written by the selected command is equal to or less than a reference value.

In operation S1570, where the amount of data written by the selected command is equal to or less than the reference value, the storage device 1000 provides a priority 3 to the selected command.

In operation S1580, where the amount of data written by the selected command is greater than the reference value, the storage device 1000 provides a priority 4 to the selected command.

The storage device 1000 may provide a higher priority to the read command than to the write command from among the at least one command stored in the command queue 1010.

The storage device 1000 may provide a higher priority to the command which writes less data than the reference value compared to the command which writes more data than the reference value.

The storage device 1000 may store data of the command which writes the data less than the reference value in the buffer memory 1410. The storage device 1000 may store the data stored in the buffer memory 1410 in the non-volatile memory unit 1420 at regular intervals. According to an exemplary embodiment, the storage device 1000 may store the data of the command which writes the data less than the reference value in the buffer memory 1410 as well as the non-volatile memory unit 1420.

The storage device 1000 may store data of the command which writes the data greater than the reference value in the non-volatile memory unit 1420 without passing the buffer memory 1410.

The reference value may be determined based on a capacity of the buffer memory 1410 or a size of a row of the buffer memory 1410. The storage device 1000 stores data less than a predetermine value in the buffer memory 1410, and thus the data may be rapidly transmitted to the host when requested by the host.

The storage device 1000 may perform scheduling to determine a priority among the at least one command stored in the command queue 1010. An exemplary standard for scheduling may be as follows:

1. a case where data of a read command may be quickly read from the buffer memory 1410;
2. a case where data of a read command is to be read from the non-volatile memory unit 1420;
3. a case where data of a write command may be quickly stored in the buffer memory 1410 (data of a write command is less than a reference value); and
4. a case where data of a write command is to be stored in the non-volatile memory unit 1420.

The storage device 1000 may select a command with a top priority as a first command and perform the first command in a first channel corresponding to the first command. The storage device 1000 may select a command with a top priority as a second command from commands not being performed in the first channel, and perform the second command in a second channel corresponding to the second command while the first command is performed in the first channel. In this instance, the storage device 1000 may perform the first command and second command in parallel.

An SSD may perform a command in parallel in relatively many channels. The SSD may have a high data input/output parallelism.

The storage device 1000 may be the SSD, use the command queue 1010, and enable the host to use the high data input/output parallelism in the SSD.

Since the host may issue a plurality of commands to the storage device 1000 in parallel due to the command queue 1010, the high data input/output parallelism in the SSD may be used. The storage device 1000 may increase a data transmission rate between the host and storage device 1000.

According to certain embodiments described above, a storage device may easily embody a system-in package (SiP) though combining and managing a memory management function.

Flash memory devices and/or memory controllers according to exemplary embodiments may be embodied using various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The flash memory devices and/or the memory controllers may constitute memory cards. In this case, the memory controllers may be constructed to communicate with an external device for example, a host using any one of various types of protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that may maintain stored data even where power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a digital video disk (DVD), a router, and a Global Positioning System (GPS).

A computing system according to an exemplary embodiment may include a microprocessor that is electrically connected with a bus, a user interface, a modem such as a base-band chipset, a main controller, and a flash memory device. The flash memory device may store N-bit data via the main controller. The N-bit data is processed or will be processed by the microprocessor and N may be 1 or an integer greater than 1. Where the computing system is a mobile apparatus, a battery may be additionally provided to supply an operation voltage of the computing system.

It will be apparent to those of ordinary skill in the art that a computing system according to an exemplary embodiment may further include an application chipset, a camera image processor (CIS), a mobile Dynamic Random Access Memory (DRAM), and the like. The main controller and the flash memory device may constitute a solid state drive/disk (SSD) that uses a non-volatile memory to store data.

It will also be apparent to those of ordinary skill in the art that methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A computing apparatus, comprising:
 a first storage media;
 a second storage media having an input/output speed slower than that of the first storage media and being included in the same device as the first storage media; and
 a hybrid file system management unit configured to
  manage a first physical file system that controls the first storage media and a second physical file system that controls the second storage media,
  provide a virtual file system that comprises files converted from the first physical file system and files converted from the second physical file system,
  convert a file from the first physical file system and/or the second physical file system into a format that is used by the virtual file system,
  convert a file from the virtual file system into a format that is used by the first physical file system and/or the second physical file system, and
  determine whether to move a file requested by an operating system from the second storage media to the first storage media based on a relative gain and a cost of a movement to the first storage media that is calculated based on an access frequency of the requested file,
 wherein, in response to the requested file being stored in the second storage media, the hybrid file system management unit is configured to calculate the relative gain and the cost according to the movement to the first storage media based on the access frequency, and move the requested file to the first storage media in response to the calculated relative gain being greater than the calculated cost, and
 wherein the hybrid file system management unit is configured to:
 determine whether an available space exists in the first storage media before moving the requested file to the first storage media;
 select a file which is the least effective with regard to a cost from among files stored in the first storage media in response to the available space not existing in the first storage media;
 move the selected file to the second storage media; and
 move the requested file to the first storage media from the second storage media.

2. The computing apparatus of claim 1, wherein:
 the first storage media is a solid state drive (SSD);
 the second storage media is a hard disk drive (HDD); and
 the hybrid file system management unit is configured to manage the first physical file system that controls the SSD and the second physical file system that controls the HDD, and provide a virtual file system manager with the virtual file system converted from the first physical file system and second physical file system.

3. The computing apparatus of claim 1, wherein the hybrid file system management unit is configured to calculate the relative gain by multiplying the access frequency and a difference between a data transmission time from the first storage media to a host and a data transmission time from the second storage media to the host, in response to the requested file being stored in the second storage media.

4. The computing apparatus of claim 1, wherein the hybrid file system management unit is configured to calculate the relative gain indicative of a reduced time of access time in a predetermined period with respect to the requested file, in response to the requested file being stored in the second storage media.

5. The computing apparatus of claim 1, wherein the hybrid file system management unit is configured to calculate the cost based on a size of the requested file and a write speed of the first storage media.

6. The computing apparatus of claim 1, wherein the hybrid file system management unit is configured to move the requested file to the first storage media in response to the calculated relative gain being greater than the calculated cost.

7. The computing apparatus of claim 1, wherein the hybrid file system management unit is configured to transmit the requested file in the second storage media to a host without moving the requested file to the first storage media in response to the calculated relative gain being equal to or less than the calculated cost.

* * * * *